US006564279B1

(12) United States Patent
Neil et al.

(10) Patent No.: US 6,564,279 B1
(45) Date of Patent: May 13, 2003

(54) METHOD AND APPARATUS FACILITATING INSERTION AND REMOVAL OF MODULES IN A COMPUTER SYSTEM

(75) Inventors: Patrick C. Neil, Richardson, TX (US); Robert Craig Hugus, Sherman, TX (US); Ananth S. Vijalapuram, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/408,735

(22) Filed: Sep. 29, 1999

(51) Int. Cl.[7] ............................................. G06F 13/00
(52) U.S. Cl. ..................... 710/302; 713/322; 713/501; 713/600
(58) Field of Search ................... 710/302, 300, 710/301, 104, 60, 62, 303, 304, 313; 713/500, 501, 600, 322

(56) References Cited

U.S. PATENT DOCUMENTS

| 5,784,576 | A | * | 7/1998 | Guthrie et al. ............... 710/302 |
| 5,809,291 | A | * | 9/1998 | Munoz-Bustamante et al. . 713/400 |
| 5,875,308 | A | * | 2/1999 | Egan et al. ................... 710/302 |
| 5,930,496 | A | * | 7/1999 | MacLaren et al. ............. 439/55 |
| 6,134,621 | A | * | 10/2000 | Kelley et al. ................. 710/104 |
| 6,185,642 | B1 | * | 2/2001 | Beukema et al. ............. 710/302 |
| 6,189,050 | B1 | * | 2/2001 | Sakarda ....................... 709/220 |
| 6,253,267 | B1 | * | 6/2001 | Kim et al. ................... 710/302 |
| 6,263,387 | B1 | * | 7/2001 | Chrabaszcz .................. 709/220 |
| 6,304,929 | B1 | * | 10/2001 | Wallach et al. .............. 710/300 |
| 6,308,233 | B1 | * | 10/2001 | Park ............................ 710/300 |
| 6,434,652 | B1 | * | 8/2002 | Bailis et al. ................. 710/301 |

OTHER PUBLICATIONS

"PCI Hot–Plug Specification" Revision 1.0, May 23, 1997, title page and pp. i–vi and 1–29.

* cited by examiner

Primary Examiner—Sumati Lefkowitz
Assistant Examiner—X. Chung-Trans
(74) Attorney, Agent, or Firm—April M. Mosby; Wade James Brady, III; Frederick J. Telecky, Jr.

(57) ABSTRACT

A computer system (10) includes a plurality of hot-plug sockets (30–33), each of which can be selectively uncoupled from a bus (59) during normal system operation, in order to facilitate insertion or removal of module (36). A clock signal (PCLK) is generated at one of two different frequencies, and at system power-up a clock arbitration circuit (47) is responsive to modules which are present for specifying a speed of the clock signal. A hot-plug controller circuit (18) can selectively uncouple one of the hot-plug sockets from the bus during normal operation to facilitate insertion or removal of a module, and also facilitates a determination of whether clock speed requirements of an inserted module are compatible with the current clock speed. The selected socket is recoupled to the bus only if the inserted module is compatible with the current clock speed.

8 Claims, 2 Drawing Sheets

METHOD AND APPARATUS FACILITATING INSERTION AND REMOVAL OF MODULES IN A COMPUTER SYSTEM

TECHNICAL FIELD OF THE INVENTION

This invention relates in general to a computer system and, more particularly, to a method and apparatus for facilitating the insertion and removal of a module from a socket in the computer system.

BACKGROUND OF THE INVENTION

In a computer system, it is common to provide one or more sockets or "slots", which can each removably receive a module. This permits the capabilities of the system to be easily modified after the system has been manufactured. As one example, the class of personal computers commonly known IBM-compatible computers often include a Peripheral Component Interconnect bus (PCI bus), which conforms to a PCI industry standard, and which includes one or more PCI sockets that can each removably receive a PCI module. A PCI module is also commonly referred to as a PCI card. Various different types of PCI modules are commercially available.

In order to insert or remove a PCI module, it was traditionally necessary to completely turn off the power to the entire computer system, in order to avoid damaging either the PCI module or the computer system during the insertion or removal of the module. However, in a multi-tasking environment, where the user has a number of programs actively running, the user faces the relatively tedious task of exiting each of these programs, turning off the power, inserting or removing the module in question, thereafter turning the power back on, and then rebooting each of the programs in question. Accordingly, the specification for the PCI standard is being extended to allow a module to be inserted into or removed from a selected socket during normal system operation, without turning off the system power. According to the revised PCI specification, this is effected by uncoupling the selected socket from the PCI bus while a module is inserted or removed from the selected socket. Since the power to the rest of the system remains on or "hot" while this occurs, this extended capability of the PCI specification is sometimes referred to as "hot-plug" capability.

One important consideration is that, according to the PCI standard, the PCI system clock may have a speed of either 33 MHz or 66 MHz. Some PCI modules are designed to operate at either of these two clock speeds. However, other PCI modules are designed to operate at only one of these two clock speeds. In some computer systems built around the original PCI standard, one of these two clock speeds is selected when power is turned on, in dependence on the specific PCI modules which happen to be present at that time in the PCI sockets of the system. Under the expanded PCI standard, with the "hot-plug" capability, insertion of a PCI module presents a problem, due to the fact that the inserted module was not taken into account when the clock speed was selected, and thus might not be compatible with the selected clock speed. The specification for the expanded PCI standard does not specify how to resolve this problem.

SUMMARY OF THE INVENTION

From the foregoing, it may be appreciated that a need has arisen for a method and apparatus for facilitating insertion and removal of a module from a socket in a computer system, without turning off power to the entire computer system, and without damaging either the module or the system, which ensures that the frequency of clock signals subsequently supplied to an inserted module are compatible with the capabilities of that module.

According to the present invention, a method and apparatus are provided to address this need, in situations where there are a plurality of sockets which can each removably receive a module and which each have a clock speed selection terminal and a clock input terminal. The method and apparatus involve: selecting one of a plurality of clock speeds as a function of information from the clock speed selection terminals of the sockets; saving an indication of the selected clock speed; thereafter providing for the clock input terminals of the sockets a clock signal at the clock speed specified by the saved indication; and thereafter permitting one of insertion and removal of a module from a selected one of the sockets during normal system operation, while continuing to provide the clock signal at the clock speed specified by the saved indication to the clock input terminals of the sockets other than the selected socket.

BRIEF DESCRIPTION OF THE DRAWINGS

A better understanding of the present invention will be realized from the detailed description which follows, taken in conjunction with the accompanying drawings, in which.

DETAILED DESCRIPTION OF THE INVENTION

Figure 1:
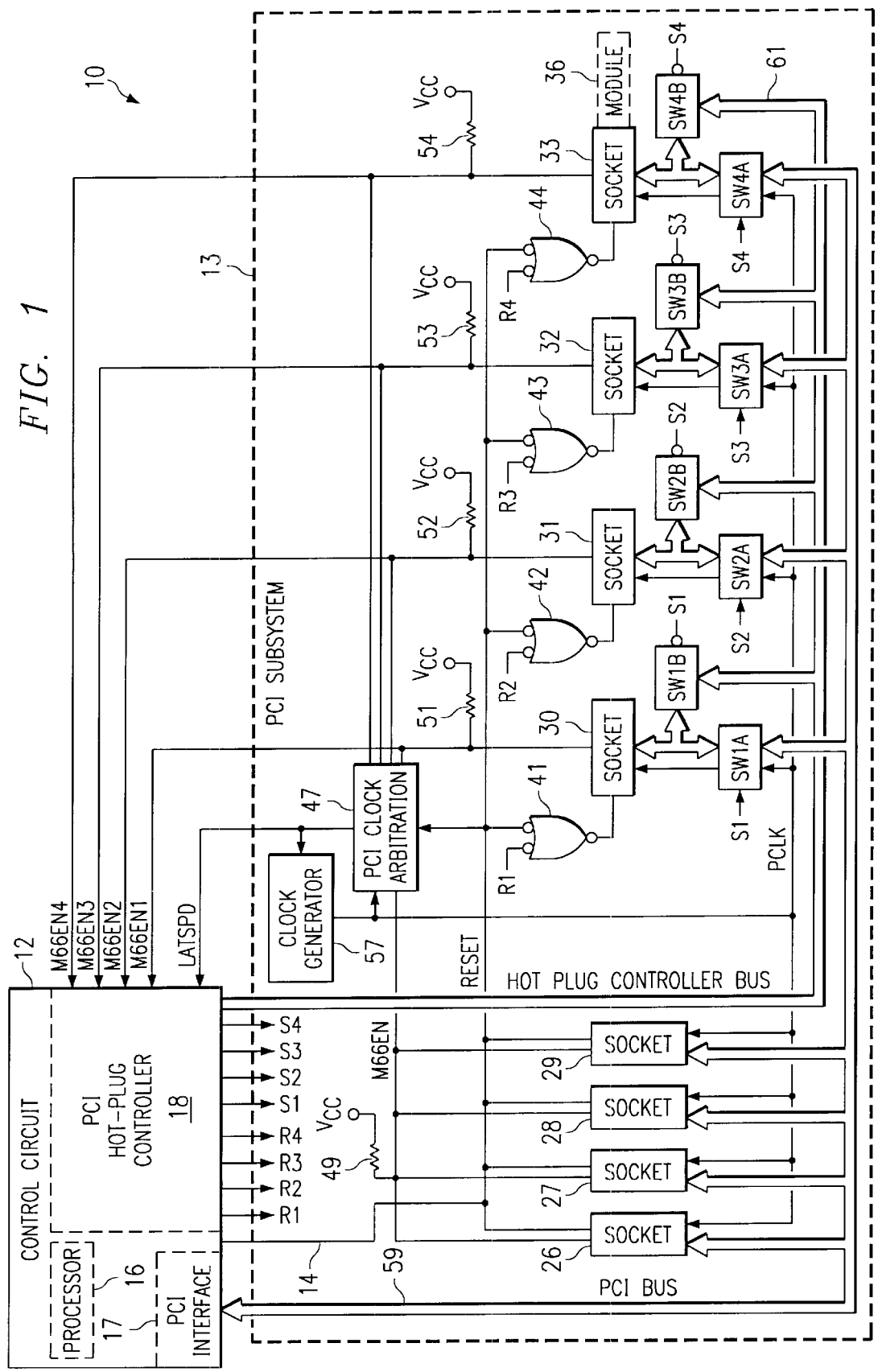
FIG. 1 is diagrammatic view of a computer system which embodies the present invention.

FIG. 1 is a diagrammatic view of a computer system 10 which embodies the present invention. In the disclosed embodiment, the computer system 10 is a class of computer commonly known as an IBM-compatible personal computer, but the invention is suitable for use in various other types of computer systems. Only the portions of the computer system 10 which are pertinent to an understanding of the present invention are shown in FIG. 1.

The computer system 10 includes a control circuit 12, and a Peripheral Component Interconnect (PCI) subsystem 13. Peripheral Component Interconnect (PCI) is an existing industry standard known to those skilled in the art, and defines a bus that operationally couples various components of a computer system. Since the PCI standard is itself known to those skilled in the art, it is not described here in detail.

The control circuit 12 includes a processor 16, which in the disclosed embodiment is a X86-compatible processor. For example, the processor 16 may be one of several processors manufactured by Intel Corporation of Santa Clara, Calif., such as the processor which is commercially available under the tradename PENTIUM. The control circuit 12 also includes a PCI interface circuit 17, which facilitates communication between the control circuit 12 and the PCI subsystem 13. In addition, as part of the present invention, the control circuit 12 includes a PCI hot-plug controller circuit 18. The control circuit 12 can generate a system reset signal RESET on a line 14, for example when power to the system is turned on. The RESET signal is coupled to various components of the computer system 10, including the PCI subsystem 13.

The PCI hot-plug controller circuit 18 can selectively generate several reset signals R1 through R4 for the PCI subsystem 13, which are described in more detail later. Similarly, the PCI hot-plug controller circuit 18 can selectively generate several switch control signals S1 through S4 for the PCI subsystem 13, which are also discussed later. The PCI hot-plug controller circuit 18 receives from the PCI subsystem a latched speed indication signal LATSPD, which is explained later. Further, the hot-plug controller circuit 18 receives from the PCI subsystem 13 four clock speed selection lines M66EN1 through M66EN4, which are also discussed later.

The PCI subsystem 13 includes a first group of PCI sockets 26–29, and a second group of PCI sockets 31–34. In the disclosed embodiment, each of these two groups of sockets is shown as including four sockets, but it will be recognized that each group could include a larger or smaller number of sockets. Each of the eight sockets 26–33 can removably receive a respective module, one example of which is shown in broken lines at 36 in association with the socket 33. The insertion or removal of each module 36 is a manual operation. At any given point in time, the sockets 26–33 may all be empty, some of the sockets 26–33 may have a respective module 36 inserted therein, or all of the sockets 26–33 may have a respective module 36 inserted therein. In the industry, a PCI socket such as that shown at 26 is sometimes referred to as a PCI "slot", and a PCI module such as that shown at 36 is sometimes referred to as a PCI "card".

The first group of PCI sockets 26–29 function in a traditional manner, in that a module 36 can be inserted into or removed from one of the sockets 26–29 only when power to the entire system 10 is turned off. Thus, the presence or absence of modules in the sockets 26–29 must be addressed following a system power-up, but after that it is not permissible to insert or remove modules from the sockets 26–29 until after power is again turned off.

In contrast, and according to the expanded PCI standard, the sockets 30–33 of the second group have enhanced functionality. In particular, these sockets have all of the traditional PCI functionality, in that PCI modules can be inserted into or removed from the sockets 30–33 when the system power is turned off. In addition, however, it is also possible to insert or remove a module from any one of the sockets 30–33 of the second group during normal system operation, without turning off the power to the entire system 10. This latter capability, namely to insert or remove modules from the sockets 30–33 while the system power is on or "hot", has led to the sockets 30–33 of the second group being referred to as "hot-plug" sockets. The manner in which this functionality is implemented for the sockets 30–33 is described later.

Since there are pre-existing PCI modules 36 which are already in the hands of prospective purchasers of the computer system 10, the eight PCI sockets 26–33 must all be compatible with all existing PCI modules, or in other words must all appear to be electrically and mechanically identical from the perspective of a module 36. Consequently, the sockets 26–33 all have the same configuration of terminals or "pins". In this regard, each of the sockets 26–33 includes a reset terminal, the reset terminals of the sockets 26–29 of the first group all being coupled directly to the RESET signal on line 14, which is an active low logic signal. Four two-input OR gates 41–44 each have an output which is coupled to the reset terminal of a respective one of the sockets 30–33 of the second group, the RESET signal being coupled to one of the inputs of each of the OR gates 41–44.

Figure 2:
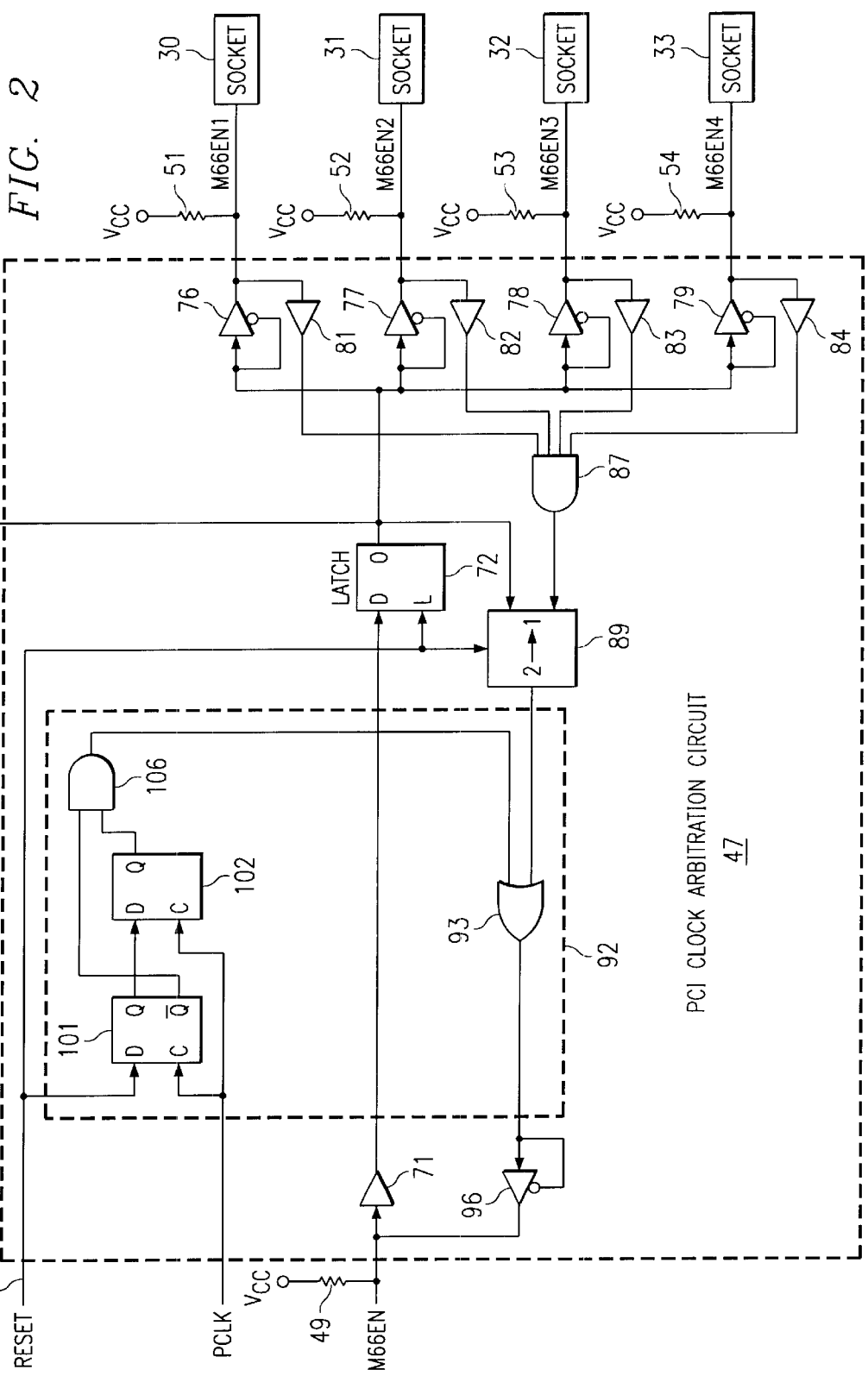
FIG. 2 is a schematic circuit diagram of a clock arbitration circuit which is a component of the computer system of FIG. 1.

The other input of each of the OR gates 41–44 receives a respective one of the reset signals R1 through R4 from the hot-plug controller circuit 18, which are all active low logic signals. The RESET signal on line 14 is also supplied to an input of a PCI clock arbitration circuit 47, which is part of the PCI subsystem 13, and which is shown in FIG. 2 and described in more detail later.

Each of the sockets 26–33 also has a clock speed selection terminal. The clock speed selection terminals for the sockets 26–29 of the first group are all connected together by a clock speed selection line M66EN, which is also coupled to the PCI clock arbitration circuit 47. The clock speed selection line M66EN is also coupled to a source of power by a pull-up resistor 49. The pull-up resistor 49 will normally maintain the clock speed selection line M66EN at a logic high level, unless a module 36 in one of the sockets 26–29 pulls it to a logic low level, as discussed below. The clock speed selection terminal of the sockets 30–33 of the second group are not coupled directly to each other. Instead, each is coupled by a respective one of the four clock speed selection lines M66EN1 through M66EN4 to the PCI clock arbitration circuit 47, and also to the hot-plug controller circuit 18. Each of the clock speed selection lines M66EN1–M66EN4 is coupled to a source of power by a respective one of four pull-up resistors 51–54.

The PCI clock arbitration circuit 47 generates the latched clock speed signal LATSPD which, as discussed above, is coupled to an input of the hot-plug controller circuit 18. The LATSPD signal is also coupled to an input of a clock generator circuit 57, which is part of the PCI subsystem 13, and which generates a clock signal PCLK that is the main clock signal for the PCI bus. According to the PCI industry standard, the clock signal PCLK must have a frequency of either 33 MHz or 66 MHz. In the disclosed embodiment, if the signal LATSPD is a logic high, then the clock generator circuit 57 generates the clock signal PCLK at 66 MHz, whereas if the signal LATSPD is a logic low, then the clock generator circuit 56 generates the clock signal PCLK at 33 MHz.

The sockets 30–33 of the second group each have a pair of switching circuits associated therewith. For example, the socket 33 has two switching circuits SW1A and SW1B associated therewith. The switching circuit S1A is controlled directly by the above-mentioned switch control signal S1 from the hot-plug controller circuit 18, whereas the switching circuit SW1B is controlled by the inverse of the switch control signal S1. Consequently, the switching circuit SW1B is disabled when the switching circuit SW1A is enabled, and vice versa. In other words, only one of the switching circuits SW1A and SW1B is enabled at any given point in time.

During normal system operation, the switching circuit SW1A is enabled and the switching circuit SW1B is disabled. The switching circuit SW1B is enabled and the switching circuit SW1A is disabled only for purposes of inserting or removing a module 36 from the socket 33 during normal system operation, as described later. In a similar manner, the socket 31 is associated with two switching circuits SW2A and SW2B which are operated under control of the switch control signal S2, the socket 32 is associated with two switching circuits SW3A and SW3B which are operated under control of the switch control signal S3, and the socket 33 is associated with two switching circuits SW4A and SW4B which are operated under control of the switch control signal S4.

Each of the eight PCI sockets 26–33 has a clock input terminal. The clock input terminals of the sockets 26–29 of the first group are each coupled to the PCI clock signal PCLK. The clock input terminals of the sockets 30–33 of the second group are each coupled to the PCI clock signal PCLK through a respective one of the switching circuits SW1A, SW2A, SW3A and SW4A.

The eight sockets 26–33 each have a plurality of bus terminals, which include address, data and control terminals. The set of bus terminals on each of the sockets 26–29 of the first group are coupled directly to a PCI bus 59, which is also coupled to the PCI interface circuit 17 in the control circuit 12. The set of bus terminals on each of the sockets 30–33 of the second group are coupled to the PCI bus 59 through a respective one of the switching circuits SW1A through SW4A. The set of bus terminals on each of sockets 30–33 is also coupled through a respective one of the switching circuits SW1B through SW4B to a hot-plug controller bus 61, which in turn is coupled to the hot-plug controller circuit 18.

It will thus be recognized that, during normal operation, the sockets 30–33 of the second group are each operationally coupled by an associated one of the switching circuits SW1A through SW4A to the PCI bus 59 and the associated PCI clock-signal PCLK. The hot-plug controller circuit 18 can, however, use any one of the switch control signals S1 through S4 to uncouple a selected one of the sockets 30–33 from the bus 59 and clock signal PCLK, so as to be able to control that selected socket using the hot-plug controller bus 61. Further, when the hot-plug controller circuit 18 has any one of the sockets 30–33 uncoupled from the rest of the system in this manner, it can selectively reset a module 36 in that socket by selectively actuating a respective one of the reset signals R1–R4.

As discussed above, the PCI industry standard provides that the PCI bus clock signal PCLK must have a speed of either 33 MHz or 66 MHz. Consequently, each PCI module 36 must be capable of operating at either 33 MHz or 66 MHz. Some existing PCI modules 36 are capable of operating at only 33 MHz, whereas others are capable of operating at either 33 MHz or 66 MHz. If a PCI module 36 is capable of operating only at 33 MHz, then according to the PCI industry standard it must be built so that the clock speed selection terminal at its connector is grounded internally by that module. On the other hand, if it is capable of working at either 33 MHz or 66 MHz, then it is built so that the clock speed selection terminal at its connector has no internal connection at all.

Thus, if any one of the sockets 26–29 of the first group contains a module 36 which can only operate at 33 MHz, then that module will be grounding the clock speed selection terminal of that socket, thereby pulling the clock speed selection line M66EN to a logic low in order to indicate that one of the sockets 26–29 contains a module 36 which is only capable of operating at the slower clock speed of 33 MHz. Otherwise, the pull-up resistor 49 will maintain the clock speed selection line M66EN at a logic high, in order to indicate that any and all modules which may be present in the sockets 26–29 are each capable of operating at the higher clock speed of 66 MHz.

Similarly, if any one of the sockets 30–33 of the second group contains a module which is only capable of operating at 33 MHz, then the associated one of the clock speed selection lines M66EN1–M66EN4 will be pulled to a logic low. Otherwise, if the socket is empty or contains a module which is capable of operating at 66 MHz, the clock speed selection line associated with that socket will be pulled to a logic high level by a corresponding one of the pull-up resistors 51–54, in order to indicate that the module 36 (if any) present in that socket is capable of operating at 66 MHz.

The PCI clock arbitration circuit 47 will now be described in more detail, with reference to FIG. 2. More specifically, in the PCI clock arbitration circuit 47, the clock selection line M66EN is coupled to an input of a buffer 71, the buffer 71 having an output which is coupled to a data input of a latch 72. The latch 72 has a latch control input which is coupled to the RESET signal on line 14, and has a data output which serves as the latched speed indication signal LATSPD. When the RESET signal is active, or in other words is a logic low, the latch 72 gates its data input to its data output. In contrast, when the RESET signal is inactive, the latch 72 maintains at its output the logic state which was present at its data input when the RESET signal changed from a logic low to a logic high.

Four buffers 76–79 each have a data input which is coupled to the data output of the latch 72. Each of the buffers 76–79 has a control or enable input which is coupled to the data input of that buffer, and has a data output which is coupled to a respective one of the clock speed selection lines M66EN1 through M66EN4. Due to the fact that each of the buffers 76–79 has its control and data inputs coupled together, if the control and data inputs are provided with a logic low signal, then the control input enables the buffer and the logic low is passed from the data input to the data output. On the other hand, if the data and control inputs are each supplied with a logic high signal, then the buffer is disabled and its output is placed in a tri-state condition. When a buffer output is in a tri-state condition, the buffer does not attempt to exert control over the line coupled to its output, but instead permits that line to be controlled by some other component coupled to the line, such as a respective one of the pull-up resistors 51–54, or a module 36 disposed in the associated one of the sockets 30–33.

The PCI clock arbitration circuit 47 also includes four buffers 81–84, which each have a data input coupled to a respective one of the clock speed selection lines M66EN1 through M66EN4. The circuit 47 further includes a four-input input AND gate 87, the four inputs of which are each coupled to an output of a respective one of the buffers 81–84.

A two-to-one selector or multiplexer 89 has a data output, a first data input which is coupled to the data output LATSPD of the latch 72, a second data input which is coupled to the output of the AND gate 87, and a control input which is coupled to the reset signal RESET on line 14. If the control input is supplied with a logic low signal, then the selector 89 gates to its output the output of the AND gate 87, whereas if the control input is supplied with a logic high signal, then the selector 89 gates to its output the output signal LATSPD from the latch 72.

The clock arbitration circuit 47 also includes a speed enable reset circuit 92, which in turn includes a two-input OR gate 93. The OR gate 93 has one of its inputs coupled to the data output of the selector 89. The output of the OR gate 93 is coupled to a data input and a control input of a tri-state buffer 96, which is similar to the buffers 76–79, and which is not part of the speed enable reset circuit 92. The output of the buffer 96 is coupled to the clock speed selection line M66EN.

The speed enable reset circuit 92 also includes a D-type flip flop 101, which has a data input coupled to the RESET signal on line 14, and a clock input coupled to the PCI clock signal PCLK. A further D-type flip flop 102 has a data input coupled to a normal data output of the flip flop 101, and has a clock input coupled to the PCI clock signal PCLK. A two-input AND gate 106 has one input coupled to an inverted data output of flip flop 101, has its other input coupled to a normal data output of flip flop 102, and has an output which is coupled to a remaining data input of the two-input OR GATE 93.

The operation of the disclosed embodiment will now be described. Following system power-up, the active low RESET signal on line 14 is asserted for a period of time, and then is deactuated. As an overview, if any one of the eight sockets 26–33 contains a module 36 which can only operate at 33 MHz, then the PCI clock arbitration circuit 47 will instruct the clock generator circuit 57 to thereafter generate the PCI bus clock signal PCLK at 33 MHz. On the other hand, if no socket contains a module capable of operating only at 33 MHz, because some or all sockets are empty and/or because any inserted modules are capable of operating at 66 MHz, the PCI clock arbitration circuit 47 will instruct the clock generator circuit 57 to generate the PCLK signal at 66 MHz.

The manner in which this is effected will now be described in more detail with reference to FIG. 2. More specifically, during a system reset, the active-low RESET signal on line 14 causes the latch 72 to pass data from its data input to its data output, and causes the two-to-one selector 89 to gate the output of AND gate 87 to the output of selector 89. If any one of the sockets 30–33 contains a PCI module 36 which can only operate at 33 MHz, then that module will be pulling the associated one of the clock speed selection lines M66EN1–M66EN4 to a logic low state, and this logic low state will be applied through a respective one of the buffers 81–84 to a respective input of the AND gate 87. Such a logic low signal at any input of the AND gate 87 will cause the output of the AND gate 87 to be a logic low, which will be passed through the selector 89, OR gate 93 and buffer 96 to the clock speed selection line M66EN, thereby forcing the clock speed selection line M66EN to a logic low state. This logic low state will be passed through the buffer 71 to the data input of latch 72, where it will pass through the latch 72 and appear at the output of the latch 72.

It will also be recognized that, if any one of the sockets 26–29 contains a module that needs a 33 MHz clock, that module will be forcing the clock speed selection line M66EN to a logic low state, which will be supplied through buffer 71 and latch 72 to the output of latch 72. Thus, if any one of the eight sockets 26–33 contains a module which can only operate at 33 MHz, the output of latch 72 will be at a logic low state during the RESET signal, regardless of whether the other sockets contain modules, and regardless of the clock speed capabilities of any module which may be present in any other socket.

On the other hand, if the sockets 26–33 are all empty, or contain only modules capable of operating at 66 MHz, then the output of latch 72 will be at a logic high state during the RESET signal. In more detail, if none of the sockets 30–33 of the second group contains a module that can only operate at 33 MHz, the associated clock speed selection lines M66EN1–E66EN4 will all be at a logic high state, as a result of which all inputs to the AND gate 87 will be at a logic high state. Consequently, the output of the AND gate 87 will be a logic high state, which is supplied through the selector 89 and GATE 93 to the data and control inputs of buffer 96. The logic high state at the control input of buffer 96 will cause the output of buffer 96 to be in the tri-state condition, where the buffer 96 does not attempt to exert any control over the clock speed selection line M66EN. Thus, the state of the clock speed selection line M66EN will be determined solely by what is present in the sockets 26–29. If the sockets 26–29 are all empty, or if every module present in the sockets 26–29 is capable of operating at 66 MHz, then the sockets 26–29 will not be attempting to pull the line M66EN to a logic low state. Thus, the pull-up resistor 49 will maintain the line M66EN at a logic high state, which will be supplied through buffer 71 and latch 72, and appear at the output of latch 72.

At the end of the power-up reset, the active-low RESET signal on line 14 will be switched from a logic low state to a logic high state, thereby causing the latch 72 to latch its output at the logic state which is currently present at its data input, and causing the selector 89 to switch to its other input, so as to supply the latched speed indication signal LATSPD from the latch 72 to the input of OR gate 93. In response to the latched speed indication signal LATSPD from the output of latch 72, the clock generator circuit 57 will thereafter generate the PCI bus clock signal PCLK at 66 MHz if LATSPD is a logic high, or at 33 MHz if LATSPD is a logic low. Further, the latched speed indication signal LATSPD from the output of latch 72 is supplied through the buffers 76–79 to the clock speed selection terminal of each of the sockets 30–33 of the second group, and is supplied through selector 89, gate 93, and buffer 96 to the clock speed selection terminal of each of the sockets 26–29 of the first group. This is so that, as to any module 36 which may be present in a socket and which is capable of operating at either 33 MHz or 66 MHz, the module can tell from looking at its clock speed selection terminal whether the PCLK signal is running at 33 MHz or 66 MHz. This enables that module to set itself up for operation at the appropriate speed of either 33 MHz or 66 MHz.

Subsequent to this power-up activity, at a time during normal system operation, a person using the computer system 10 may decide to insert or remove a module 36 from one of the hot-plug sockets 30–33, without turning off power to the computer system 10. The user therefore causes the processor 16 to execute a program which permits the user to select one of the hot-plug sockets 30–33. In a multi-tasking environment, this program may be an additional application program running at the same time as other application programs, under control of a multi-tasking operating system. For purposes of this discussion, it will be assumed that the user selects the socket 33.

The processor 16 then instructs the hot-plug controller circuit 18 to uncouple the selected socket 33 from the rest of the system, by inverting the switch control signal S1. This inversion of the switch control signal S1 disables the switching circuit SW4A in order to uncouple the selected socket 33 from the PCI bus 59 and the PCI clock signal PCLK, and enables the switching circuit SW4B in order to couple the socket 33 to the hot-plug controller circuit 18 through the hot-plug controller bus 61. The processor then displays a message telling the user to insert or remove a module from the selected socket 33. The user can then manually insert or remove a module 36 from the socket 33, and then indicate to the processor 16 that the insertion or removal has been completed.

If the selected socket 33 is now empty, the processor 16 can simply instruct the hot-plug controller circuit 18 to recouple the socket 33 to the PCI bus 59 and the clock signal PCLK. On the other hand, if a module 36 has just been inserted into the socket 33, some additional processing is required before the socket 33 can be recoupled to bus 59 and clock signal PCLK.

More specifically, the processor 16 can cause the hot-plug controller circuit 18 to actuate the reset signal R4, so that the gate 44 supplies a reset signal to the module 36 which has been inserted into the socket 33. Then, through the bus 61 and the switching circuit SW4B, the hot-plug controller circuit 18 can interrogate and/or initialize the module 36 which has been inserted into the socket 33, to the extent that this may be necessary for the particular module in question.

At this point, in a manner which has been previously discussed in detail, the module 36 inserted into the socket 33 will be controlling the clock speed selection terminal of socket 33 in a manner corresponding to the clock speed capabilities of the inserted module 36, and this information will be supplied through the clock speed selection line M66EN4 to an input of the hot-plug controller circuit 18. This is facilitated by the fact that each of the sockets 30–33 of the second group has been provided with its own clock speed selection line. Through the hot-plug controller circuit 18, the processor 16 can compare the information provided on clock speed selection line M66EN4 by the inserted module to the latched clock speed indication signal LATSPD, in order to determine whether the newly-inserted module 36 is capable of working at the current clock speed of the PCI bus clock signal PCLK. If the newly-inserted module 36 is found to be incompatible with the current speed of the clock signal PCLK, then the processor 16 does not permit the hot-plug controller circuit 18 to recouple the selected socket 33 to the PCI bus 59 and the PCI clock signal PCLK. Instead, the processor 16 advises the user that the newly-inserted module 36 cannot be connected into the system. If a system reset were to subsequently occur, the newly-inserted module would be taken into account in setting the clock speed and would then be allowed to operate, but until such a reset the incompatible module would be ignored.

On the other hand, if the processor 16 determines through the hot-plug controller circuit 18 that the newly-inserted module 36 is compatible with the current speed of the PCLK signal, then the processor 16 causes the hot-plug controller 18 to again invert the switch control signal S4, so that the switching circuit SW4B is disabled and the switching circuit SW4A is enabled, thereby recoupling the socket 33 to the PCI bus 59 and the PCI clock signal PCLK. Each time the hot-plug controller changes the state of one of the switching control signals S1–S4, the hot-plug controller circuit 18 effects the change at a point in time when the PCI bus 59 is in an idle cycle, in order to avoid synchronization problems between the PCI bus 59 and the module 36 inserted in the selected socket.

The operation of the speed enable reset circuit 92 will now be described. If the circuit 92 was not present, and if the computer system 10 was operating with the PCI clock signal PCLK at 33 MHZ at a time when a warm boot was initiated (causing the RESET signal to be asserted without an actual termination of system power), it would be theoretically possible for the clock arbitration circuit of FIG. 2 to become latched in a state selecting the 33 MHz clock speed, without regard to the speed capabilities of any modules 36 which might be present in the sockets 26–33. The speed enable reset circuit 92 is provided to prevent such a latched state. In particular, each time the RESET signal is first asserted and is clocked successively through the flip-flops 101 and 102, the AND gate 106 responds by outputting a logic high pulse which lasts for one cycle of the clock signal PCLK. This pulse from the output of the AND gate 106 is applied through the OR gate 93 and buffer 96 to the clock speed selection line M66EN. If the circuit 47 happened to be artificially latched in a condition corresponding to a clock speed of 33 MHz, this pulse would interrupt that latched condition, after which the circuit 47 would determine the proper clock speed in the manner already described in detail above.

The present invention provides a number of technical advantages. One such technical advantage is that an indication of a selected clock speed is saved following powerup so that, when a module is inserted into or removed from a computer system during normal operation of the computer system, an inserted module does not tie directly into a line controlling the selected clock speed. Another advantage is that the clock speed capabilities of an inserted module are compared to a current clock speed at which the system is operating, and the module is automatically prevented from being coupled into the system if an incompatibility is detected, thereby avoiding disruption of the operation of the remainder of the system, and also avoiding the risk of damage to either the module or the system. Still another advantage is that this is effected using a relatively minimal amount of additional hardware, and thus without any significant increase in the cost to manufacture the personal computer system. A related advantage is that this is achieved in a manner which is transparent to other modules, and without requiring any change to pre-existing modules.

Although one embodiment has been illustrated and described in detail, it should be understood that various substitutions and alternations can be made thereto without departing from the spirit and scope of the invention. For example, although the disclosed embodiment implements the present invention in the specific context of a PCI bus, it will be recognized that the present invention is equally suitable for use with other types of buses and/or socket arrangements. Further, the disclosed embodiment addresses a specific context in which there are two competing clock speeds, but it will be recognized that the present invention could be utilized in other contexts where there are more than two competing clock speeds. Also, the disclosed embodiment provides four hot-plug sockets which can be selectively uncoupled from a system in order to facilitate insertion or removal of a module during normal operation, but it will be recognized that a larger or smaller number of hot-plug sockets could be provided.

It should also be recognized that direct connections disclosed herein could be altered, such that two disclosed components or elements would be coupled to one another through an intermediate device or devices without being directly connected, while still realizing the present invention. Other changes, substitutions and alterations are also possible without departing from the spirit and scope of the present invention, as defined by the following claims.

What is claimed is:

1. An apparatus, comprising:
    a plurality of sockets which can each removably receive a module and which each have a clock speed selection terminal and a clock input terminal, wherein said sockets include a first and second group of sockets which are mutually exclusive; and
    a circuit which is coupled to said plurality of sockets and which is operative to:
        select one of a plurality of clock speeds as a function of information from said clock speed selection terminals of said sockets;
        save an indication of the selected clock speed;
        thereafter provide for said clock input terminals of said sockets a clock signal at the clock speed specified by the saved indication; and
        thereafter permit one of insertion and removal of a module from a selected one of said sockets during normal system operation thereafter, while continuing to provide the clock signal at the clock speed specified by the saved indication to the clock input terminals of the sockets other than the selected socket, said selected socket being in said second group and said sockets other than the selected socket being in said first group;

said circuit including:

a gate having a plurality of inputs each coupled to said clock speed selection terminal of a respective said socket of said second group, having an output;

a multiplexer having a first data input coupled to said output of said gate, having a second data input having a selector input coupled to a reset line, and having a data output coupled to a clock speed selection line, said clock speed selection line being coupled to said clock speed selection terminals of each of said sockets of said first group; and a latch having a data input coupled to said clock speed selection line, having a control input coupled to said reset line, and having a data output coupled to said second data input of said multiplexer.

2. An apparatus according to claim 1, wherein said gate is an AND gate.

3. An apparatus according to claim 1, wherein said circuit further includes:

a plurality of first buffers which each have a data input coupled to said clock speed selection terminal of a respective said socket of said second group, and which each have a data output coupled to a respective said data input of said gate; and a plurality of second buffers which each have a data input coupled to said output of said latch, which each have an enable input coupled to said output of latch, and which each have a data output coupled to said clock speed selection terminal of a respective said socket of said second group.

4. An apparatus according to claim 1, wherein said circuit further includes:

a first buffer having a data input coupled to said clock speed selection line, and having a data output coupled to said data input of said latch; and a second buffer having a data input coupled to said output of said multiplexer, having an enable input coupled to said output of said multiplexer, and having a data output coupled to said clock speed selection line.

5. An apparatus according to claim 1, wherein said circuit further includes a speed enable reset circuit having a portion which generates a pulse in response to said reset line being asserted, and having a further gate which has a first input coupled to said output of said multiplexer, which has a second input to which the pulse is applied, and which has an output coupled to said clock speed selection line.

6. An apparatus according to claim 5, wherein said further gate is an OR gate.

7. An apparatus according to claim 5, wherein said portion of said speed enable reset circuit includes:

a first flip-flop having a data input coupled to the reset signal, having a clock input coupled to the clock signal, having a normal data output, and having an inverted data output;

a second flip-flop having a data input coupled to said data output of said first flip-flop, having a clock input coupled to the clock signal, and having a data output; and an AND gate having a first input coupled to said inverted output of said first flip-flop, having a second input coupled to said data output of said second flip-flop, and having an output coupled to said second input of said further gate.

8. An apparatus according to claim 1, wherein said sockets are each coupled to a bus, and wherein said circuit is operable to:

electrically uncouple said selected socket from said bus;

thereafter permit the insertion of the module into said selected socket;

detect a desired clock speed of the inserted module from said clock speed selection terminal of said selected socket;

compare the desired clock speed to the clock speed specified by the saved indication;

leave said selected socket electrically uncoupled from said bus if the desired clock speed is incompatible with the saved indication; and electrically recouple said selected socket to said bus if the desired clock speed is compatible with the saved indication, including provision of the clock signal at the clock speed specified by the saved indication to said clock input terminal of said selected socket.

* * * * *

UNITED STATES PATENT AND TRADEMARK OFFICE
CERTIFICATE OF CORRECTION

PATENT NO. : 6,564,279 B1
DATED : May 13, 2003
INVENTOR(S) : Neil et al.

It is certified that error appears in the above-identified patent and that said Letters Patent is hereby corrected as shown below:

Title page,
Under "Filed: Sep 29, 1999" insert Item: -- [63] Related U.S. Application Data
Provisional Application No. 60/102,378, Sep 29, 1998 --.

Column 1,
Line 4, after the title, insert: -- This application claims priority under 35 USC 119(e)(1) of provisional application number 60/102,378, filed 09/29/98. --

Signed and Sealed this

Twenty-first Day of October, 2003

JAMES E. ROGAN
*Director of the United States Patent and Trademark Office*